United States Patent [19]

Hays

[11] 3,959,230

[45] May 25, 1976

[54] POLYETHYLENE OXIDE TEREPHTHALATE POLYMERS

[75] Inventor: Hugh Robert Hays, Harrison, Ohio

[73] Assignee: The Procter & Gamble Company, Cincinnati, Ohio

[22] Filed: June 25, 1974

[21] Appl. No.: 482,949

[52] U.S. Cl. ............................ 260/75 R; 252/8.6; 252/8.9; 260/29.2 E; 428/272; 428/290
[51] Int. Cl.$^2$ .......................................... C08G 63/18
[58] Field of Search .................. 260/75 R, 29.2 E; 117/138.8 F

[56] References Cited
UNITED STATES PATENTS

| | | | |
|---|---|---|---|
| 2,744,087 | 5/1956 | Snyder | 260/75 R |
| 3,023,192 | 2/1962 | Shivers | 260/75 R |
| 3,512,920 | 5/1970 | Dunlap | 260/75 R X |
| 3,625,754 | 12/1971 | Dunn | 117/138.8 F |
| 3,712,873 | 1/1973 | Zenk | 260/29.2 E |
| 3,821,023 | 6/1974 | Amati et al. | 117/138.8 F X |
| 3,893,929 | 7/1975 | Basadur | 260/29.2 E X |

FOREIGN PATENTS OR APPLICATIONS

| | | |
|---|---|---|
| 1,119,367 | 7/1968 | United Kingdom |
| 1,175,207 | 12/1969 | United Kingdom |

*Primary Examiner*—Murray Tillman
*Assistant Examiner*—W. C. Danison, Jr.
*Attorney, Agent, or Firm*—Charles R. Wilson; Jerry J. Yetter; Richard C. Witte

[57] ABSTRACT

Novel terephthalate polymers containing ethylene terephthalate and polyethylene oxide terephthalate units in specific molar ratios and a process for imparting improved soil release properties to fabrics by treating said fabrics with a dilute aqueous solution of said polymers are provided.

4 Claims, No Drawings

POLYETHYLENE OXIDE TEREPHTHALATE POLYMERS

BACKGROUND OF THE INVENTION

This invention relates to novel polymers prepared from ethylene glycol, polyethylene oxide and terephthalic acid. When applied to fabrics from an aqueous rinse bath having a pH of 3 to 10, or from an aqueous laundering solution, said polymers impart superior soil release benefits, particularly to fabrics composed of polyester fibers.

Much effort has been expended in designing various compounds capable of conferring soil release properties to fabrics woven from polyester fibers. These fabrics are mostly co-polymers of ethylene glycol and terephthalic acid, and are sold under a number of tradenames, e.g., Dacron, Fortrel, Kodel and Blue C Polyester. The hydrophobic character of polyester fabrics makes their laundering (particularly as regards oily soil and oil stains) difficult, principally due to the inherent low wettability of the polyester fibers. Since the inherent character of the fiber itself is hydrophobic, or oleophilic, once an oily soil or oily stain is deposited on the fabric it tends to be "attached" to the surface of the fiber. As a result, the oily soil or stain is difficult to remove in an aqueous laundering process.

When hydrophilic fabrics such as cotton are soiled by oily stains or oily soil, it is well-recognized that the oil is much more easily removed than in the case of hydrophobic polyester fabrics. The difference in oil removal characteristics is apparently caused by a greater affinity of cotton fabrics for water. The differences in hydrophilic/hydrophobic characteristics of cotton and polyester are due in part to the basic building blocks of the fibers themselves. That is, since polyester fibers are copolymers of terephthalic acid and ethylene glycol, they have less affinity for water because there are fewer free hydrophilic groups, e.g., hydroxyl or carboxyl groups, where hydrogen bonding can occur. With cotton, which is a cellulose material, the large number of hydrophilic groups provides compatibility with, and affinity for, water.

From a detergency standpoint, the most important difference between hydrophobic fabrics and hydrophilic fabrics is the tendency for oily soil to form easily removable droplets when present on a hydrophilic fabric and in contact with water. Mechanical action of washing and the action of synthetic detergents and builders normally used in the washing step of the laundering process removes such oil droplets from the fabric. This droplet formation is in contrast to the situation which exists with a polyester (hydrophobic) fiber. Water does not "wick" well through hydrophobic fabrics and the oily soil or stain tends to be retained throughout the fabric, both because of the inherent hydrophobic character of the fabric and the lack of affinity of oily soils for water.

Since polyester and polyester-blend fabrics (e.g., polyester-cotton blends) are susceptible to oily staining, and, once stained, are difficult to clean in an aqueous laundry bath, manufacturers of polyester fibers and fabrics have sought to increase the hydrophilic character of the polyester to provide ease of laundering.

A number of approaches to the problem of increasing the hydrophilic character of polyester fabrics and fabric blends have been taken. Many of these approaches involve a process applied by the textile/fiber manufacturer or the textile manufacturer. Netherlands Application 65/09456 [see also D. A. Garrett and P. N. Hartley, *J. Soc. Dyers and Colourists*, 82, 7, 252-7 (1967) and Chem. Eng. News, 44, 42–43 (Oct. 17, 1966)] describes the treatment of polyester fabrics in which a copolymer of terephthalic acid with a polyethylene glycol is padded on the polyester fiber using an emulsion containing a 20% concentration of the padding agent, a polyester swelling agent such as benzyl alcohol, and heat. The object of this treatment is to give the basic polyester fiber more hydrophilic character, thereby reducing the tendency of the polyester fiber to retain oily stains.

Different polyester fabric finishing techniques are, for example, described in: German Pat. No. 1,194,363; Netherlands Application No. 65/02428; Belgium Pat. No. 641,882; and French Pat. No. 1,394,401.

British Pat. No. 1,088,984 relates to a modifying treatment for polyester fibers whereby a polyethylene terephthalate polymer is applied to the surface of said fibers. The polymers employed contain ethylene terephthalate and polyethylene oxide terephthalate units at a molar ratio from 1:1 to 8:1. The polyethylene oxide used for preparing these polymers has a molecular weight in the range of 300 to 6,000, preferably from 1,000 to 4,000.

British Pat. No. 1,175,207 discloses a process for treating filaments and fibers by contacting same with polyesters containing from about 10% to about 50% by weight of crystalline polyester segments which are identical with the repeat units forming the crystalline segment of the polyester fiber, and from about 90% to about 50% by weight of water solvatable polyoxyalkylene ester segments. The polymers employed are identical to those disclosed in British Pat. No. 1,088,984 discussed above.

British Pat. No. 1,092,435 deals with a stable dispersion of water-insoluble graft polymers containing polyoxyethylene glycol and polyethylene terephthalate. This polymer has a ratio of ethylene terephthalate to polyoxyethylene terephthalate from about 2:1 to about 6:1. Also, the teachings of British Pat. No. 1,119,367, and Dutch Pat. Application No. 66/14134, relate to the application to fibers of surface modifying agents as described in the patents referred to hereinabove.

U.S. Pat. No. 3,712,873, Zenk, discloses the use of polyester polymers in combination with quaternary ammonium salts as fabric treatment compositions. Terpolymers having a molecular weight in the range from 1,000 to 100,000, and a molar ratio of terephthalic acid:polyglycol: glycol from 4.5:3.5:1 are disclosed. Co-pending application U.S. Ser. No. 328,824, filed Feb. 1, 1973, Basadur, relates to compositions and processes for imparting a renewable soil release finish to polyester-containing fabrics. Polyesters based on terephthalic acid, ethylene glycol and polyethylene oxide and their use in acidic fabric rinses are disclosed. The polymers have a molecular weight in the range from 1,000 to 100,000, and the polyethylene oxide link has a molecular weight of 1300 to 1800.

The concurrently filed U.S. patent application Ser. No. 482,948, inventor, Charles H. Nicol, entitled LIQUID DETERGENT COMPOSITIONS HAVING SOIL RELEASE PROPERTIES, discloses compositions comprising nonionic surfactants, ethanolamine-neutralized anionic surfactants, free ethanolamine and a soil-release polymer which can be identical to the novel polymers claimed herein.

The prior art polymers do not provide an optimum solution to the soil release problem inherent with any hydrophobic fiber mainly because of lack of durability and marginal-to-unsatisfactory soil release performance. Moreover, many of the prior art soil release polymers lack the necessary substantivity to fibers under conditions of neutral-to-alkaline pH, i.e., under common laundering conditions. In addition, some of the known polymers seem to require calcium ions for fiber substantivity. Of course, the presence of free calcium or other water hardness cations is preferably avoided in a laundering operation.

It has now been found that certain hydrophilic terephthalate-based polymers having critical ratios of monomer units as well as critical limitations on the molecular weight of the hydrophilic moieties in the polymers are particularly useful as soil-release agents. The in-use superiority of the polymers herein over those of the prior art is surprising in that nothing in the vast literature in this area suggests that the critical polymer design now provided would have any additional effect on soil release properties.

It is the object of this invention to provide novel soil-release polymers based on ethylene terephthalate and polyethylene oxide terephthalate.

It is another object of this invention to provide a process for imparting an improved soil release finish to hydrophobic textiles, especially polyester.

The above objects are met through the discovery of novel terephthalate polymers which are unexpectedly valuable for the surface treatment of textiles.

SUMMARY OF THE INVENTION

The polymeric soil release agent herein is a polyester comprising ethylene terephthalate and polyethylene oxide terephthalate at a molar ratio of ethylene terephthalate to polyethylene oxide terephthalate of from about 25:75 to about 35:65, said polyethylene oxide terephthalate containing polyethylene oxide having a molecular weight of from about 300 to 700, the molecular weight of said polymer being in the range from about 25,000 to about 55,000.

As can be determined by a close study of the multiple references cited hereinabove, the molar ratio of ethylene terephthalate:polyethylene oxide terephthalate moieties of the instant polymers is the opposite of that generally taught by the prior art. Moreover, the molecular weight of the polyethylene oxide "linking unit" is much lower than that generally used in soil release polymers. Finally, the polymers herein are characterized by their relatively narrow molecular weight range over soil-release polymers know heretofore.

In its process embodiment, this invention provides a method for imparting soil release properties to fabrics comprising treating said fabrics with an aqueous solution containing an effective amount, i.e., enough to provide a soil-release benefit, of the aforesaid polymer. For most purposes a solution concentration of from about 0.001% to about 1% by weight of the polymers herein is sufficient for this purpose.

Surprisingly, the polymers herein are useful in solution over a broad pH range of from about 3 to about 10. Accordingly, the polymers are useful under alkaline laundering conditions as well as in aqueous acid "scours".

In another compositional aspect, the present invention encompasses soil release compositions in liquid form comprising the above polymers, a liquid carrier, and a non-derging amount of an emulsifier in a weight ratio of polymer:emulsifier of from about 200:1 to about 5:1.

DETAILED DESCRIPTION OF THE INVENTION

The novel polymers of this invention contain ethylene terephthalate groups having the formula:

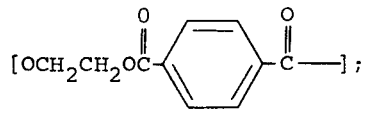

and polyethylene oxide terephthalate groups having the formula

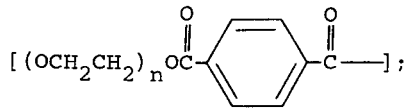

the molar ratio of ethylene terephthalate to polyethylene oxide terephthalate being from about 25:75 to about 35:65, preferably about 30:70. In the formulas, n is an integer from about 7 to about 16, i.e., the molecular weight of the polyethylene oxide linking unit is in the range from about 300 to about 700, preferably from about 500 to about 650. The polymers herein have a molecular weight in the range from about 25,000 to about 55,000, preferably from about 40,000 to about 55,000. The polymers are also characterized by a random structure, i.e., due to the method of preparation, all possible combinations of ethylene terephthalate and polyethylene oxide terephthalate are present.

The preferred polymers of this invention are prepared by using only those molar ratios of precursor materials which provide the critical ratios of ethylene terephthalate: polyethylene oxide terephthalate set forth above. These precursors are polymerized in the manner described hereinafter. For example, a highly preferred polymer herein is prepared from, and, accordingly comprises, a mole ratio of terephthalic acid:ethylene glycol:polyethylene oxide of about 1.0:0.3:0.7. Additionally, the preferred polymers of this invention have a melting point below about 100°C.

Polymer Preparation

The polymerization process used herein is an esterification reaction similar to those known in the art. However, the concentrations and ratios of polymer precursors used in such processes must be fixed so as to meet the compositional requirements of the instant polymers. As an example, the polymers of this invention can be prepared according to the process described in the specification of British Pat. No. 1,119,367, with reactant ratios modified as follows.

194 g. dimethyl terephthalate, 67 g. ethylene glycol, 420 g. polyethylene oxide (molecular weight 600), 0.44 g. 2,6-di-tert-butyl-4-methylphenol, 0.0776 g. antimony trioxide, and 0.3024 g. calcium acetate were mixed in a suitable reaction vessel and heated to 210°C with stirring over a 1.5 hour period. During this time, methanol and some dimethyl terephthalate were distilled from the reaction vessel. The reaction temperature was then raised to 280°C and held there for two hours. Following addition of 0.282 g. of a 24.8% solution of phosphorous acid in ethylene glycol, a stream of nitrogen was blown over the reaction and allowed to exhaust for two hours. Dispersions of the polymer so formed can be made by mixing the molten polymer with water in a Waring blender.

It should be noted that in the preparation of preferred polymers herein the nitrogen exhaustion preferably lasts from about 2 hours to about 2.5 hours. Lowering the nitrogen-exhaustion to about 1.5 hours or increasing it to about 3.0 hours adversely affects the soil-release characteristics of the polymers.

Polymer Use

The polymers described hereinabove are employed as dilute aqueous solutions. Fabrics to be treated are immersed in the solution and the soil release polymers adsorb on the fabric surfaces, thereby forming a hydrophilic film which remains on the fibers after the fabric is removed from the solution and dried. This film makes the polyester fibers more wettable and thus oily soils and stains deposited on the fabric prior to the next laundering are more easily removed in said laundering than if the soil release polymer were not present on said polyester fibers. Most of the soil release polymer deposited on the polyester fibers from an aqueous bath, as described above, is removed in the first subsequent laundering, carrying the oily soil. It is preferable to apply a new film of soil release polymer in the rinse step after each laundering. If the laundering process has several rinses, it is preferred that the soil release polymer be applied in the last rinse, since subsequent rinses after application will remove some of the polymer from the fabric. By renewing the soil release finish after each laundering in the manner described above, a high and constant level of soil release performance is maintained on the fabric throughout its life.

It has been found, according to the present invention, that the subject polymeric soil release agents can be effectively deposited on the fabric from a dilute aqueous bath having a pH in the range from about 3 to 10, preferably a pH around 7.

The soil release polymers herein are conveniently used at concentrations of from about 0.001% to about 1.0% by weight in the aqueous rinse bath. Preferably the concentration of soil release polymer is from about 0.004% to about 0.25% by weight of the bath. The amount of fabric in the aqueous bath can vary widely, but is generally from about 1% to 50% by weight of the water and is preferably from about 3% to about 25% of the water, to provide good contact with all fabric surfaces.

The temperature of the aqueous bath can be from about 50°F to about 212°F, but is preferably from about 100°F to about 130°F. The length of time the fabrics are present in the aqueous bath should be at least 0.5 minutes and and is preferably from 2 to about 9 minutes. The water hardness of the aqueous bath is not critical to the practice of the invention.

Rinse Compositions

It is preferable to have an emulsifying agent present in the aqueous bath containing the polymeric soil release agent in order to maintain an even dispersion. Since the compositions herein are used in a rinse bath, the amount of emulsifier should be low enough that no substantial amount of suds is formed. Accordingly, a non-deterging amount of emulsifier is employed in the bath. Emulsifier concentrations of from about 0.00005% to about 0.005% (wt.) of the aqueous rinse bath are suitable. The emulsifier is conveniently added to the rinse bath concurrently with the soil release polymer. Unitary compositions comprising an effective amount of the soil release polymer and emulsifier at a weight ratio of polymer:emulsifier of from about 200:1 to about 5:1 are especially useful as rinse bath additives. Compositions containing the instant polymers and a high, detersive amount of surfactant adapted for use in an aqueous laundry bath are disclosed in the concurrently filed application of Nicol and Hays, Ser. No. 483,185, Emulsifiers useful herein include any of the surface active agents of the anionic, nonionic, ampholytic or zwitterionic type. Examples of suitable anionic surface active agents are sodium salts of fatty alcohol sulfates having from 8–18 carbon atoms in the fatty chain, and sodium salts of alkyl benzene sulfonates having from 9 to 15 carbon atoms in the alkyl chain. Suitable nonionic surface active agents include the polyethylene oxide condensates of alkyl phenols, wherein the alkyl chain contains from about 6 to 12 carbon atoms and the amount of ethylene oxide condensed onto each mole of alkyl phenol is from about 5 to 25 moles. Specific examples are the condensation product of one mole of nonylphenol with 10 moles of ethylene oxide and the condensation product of one mole of $C_{12}$ fatty alcohol and 10 moles of ethylene oxide. Examples of suitable ampholytic surface active agents are derivatives of aliphatic secondary or tertiary amines in which one of the aliphatic substituents contains from about 8 to 18 carbon atoms and one contains an anionic water solubilizing group, e.g., sulfate or sulfonate. Specific suitable ampholytic surface active agents are 3-dodecylaminopropionate and sodium 3-dodecylaminopropanesulfonate. Examples of suitable zwitterionic surface active agents are derivatives of aliphatic quaternary ammonium compounds in which one of the aliphatic constituents contains from about 8 to 18 carbon atoms and one contains an anionic water solubilizing group. Specific examples of zwitterionic surface active agents are 3-(N,N-dimethyl-N-hexadecylammonio)propane-1-sulfonate and 3-(N,N-dimethyl-N-hexadecylammonio)-2-hydroxy propane-1 -sulfonate. Many other suitable surface active agents are described in Detergents and Emulsifiers — 1969 Annual by John W. McCutcheon, Inc., which is incorporated by reference herein.

The preferred liquid compositions herein provide a homogeneous solution or suspension of the polymeric soil release agents herein. Such liquid compositions insure ease-of-mixing and homogeneous dispersion of the soil release polymers throughout the rinse bath. Preferred liquid compositions herein comprise:

a. from about 1% to about 20% by weight of the soil release polymer;

b. from about 0.01% to about 0.1% by weight of an emulsifier, preferably an ethoxylated nonionic emulsifier as described hereinabove; and c. the balance of said composition comprising a liquid carrier.

useful liquid carriers herein include water (preferred), water-ethanol and water-isopropanol mixtures. The alcohol concentrations should be less than about 15% of the total carrier component.

Optionals

Other textile treating agents such as blueing, perfume, optical brighteners, and the like, can be co-present in the compositions and rinse baths containing soil release polymers in order to provide simultaneous application of such agents and the soil release polymer.

Test Procedure

The superior soil release performance achieved by the instant polymers on textiles composed of polyesters is assessed with the aid of the Dirty Motor Oil (DMO) removal test as described hereinafter.

Ten 2.5 inch square Dacron test swatches were treated with 1 liter of polymer-containing rinse solution in a TERGOTOMETER at 120°F and 100 rpm agitation speed for a specific time. The polymers used in the test are set forth in Table I. The concentration of the soil release polymer in the rinse solution was varied from 0.005% to 0.05% by weight. The swatches were then removed from the washing machine, squeezed to remove excess solution, and dried for two hours at room temperature.

Dirty motor oil (0.1 ml.) was then dropped in the center of each test swatch. After a one hour aging period at ambient conditions, the swatches were washed in a TERGOTOMETER using a 0.15% (wt.) aqueous solution of a commercial detergent concentration at a water hardness of 7 grains per gallon. The cleaning operation was followed by two rinsing steps of five and two minutes, respectively, with 7 grains per gallon, 120°F water (no soil release polymer). Thereafter, the swatches were dried and reflectance measurements were carried out on a GARDNER Meter. The percent cleaning improvement (whiteness) is relative to a base line of zero for the detergent composition employed on a fabric which was not treated with any soil release polymer. A score of 100% represents an unstained reference swatch. The percent cleaning improvement from the soiled swatches was calculated according to the following formula:

$$\% \text{ Cleaning Improvement} = \frac{La - Lb}{Lc - Lb}$$

La = Gardner meter reflectance of fabric treated with soil release agent, soiled as described and washed with conventional TIDE detergent composition.

Lb = Gardner meter reflectance of fabric soiled and washed with conventional TIDE detergent composition.

Lc = Gardner meter reflectance of original, unwashed, unsoiled fabric.

The polymers used in the test procedure can all be prepared by the general esterification reaction set forth above. The polymer component ratios are as follows:

TABLE I

| Polymer No. | Dimethyl Terephthalate (moles) | | Polyethylene Oxide (moles); | (molecular wt.) | Ethylene Glycol (moles) | |
|---|---|---|---|---|---|---|
| I | 100 | (194g) | 15; | 1500 (225g) | 85 | (189g) |
| II | 100 | (194g) | 70; | 1500 (1050g) | 30 | (67g) |
| III | 100 | (194g) | 30; | 3000 (900g) | 70 | (155g) |
| IV | 100 | (194g) | 30; | 600 (180g) | 70 | (155g) |
| V * | 100 | (194g) | 70; | 600 (420g) | 30 | (67g) |
| VI | 100 | (97g) | 46; | 1540 (354g) | 54 | (61g) |
| VII * | 100 | (194g) | 70; | 600 (420g) | 30 | (67g) |

TABLE I-continued

| Polymer No. | Dimethyl Terephthalate (moles) | | Polyethylene Oxide (moles); | (molecular wt.) | Ethylene Glycol (moles) | |
|---|---|---|---|---|---|---|
| VIII * | 100 | (194g) | 70; | 600 (420g) | 30 | (67g) |
| IX * | 100 | (194g) | 70; | 600 (420g) | 30 | (67g) |
| X * | 100 | (194g) | 70; | 600 (420g) | 30 | (67g) |
| XI * | 100 | (194g) | 70; | 600 (420g) | 30 | (67g) |
| XII | 100 | (194g) | 50; | 1000 (500g) | 50 | (111g) |

\* Soil release polymer within the scope of the present invention.

When preparing the compositions herein, excess ethylene glycol can be employed in the reaction medium as a solvent up to a molar ratio of ethylene glycol:polyethylene oxide of about 1.5:1. Even in the presence of excess ethylene glycol, the reaction proceeds to form polymers having the desired high molar ratio of ethylene oxide terephthalate:ethylene terephthalate (EOT:ET ratios). This is apparently due to the higher rate of polymerization of the dimethyl terephthalate with polyethylene oxide than with ethylene glycol. When the prior art compositions (Polymers I-IV and XII) are prepared, the reaction mixture is "swamped" with excess ethylene glycol, thereby assuring the presence of high ratios of ethylene terephthalate units in the final polymer.

Inasmuch as the present compositions are prepared by a simple esterification reaction, it will be recognized that the compositions falling within the scope of the present invention can be prepared by simply adjusting the reactant ratios.

Results from the foregoing DMO test involving Polymers I – XII are set forth in Table II. In the tests, the instant soil release polymers having a high molar ratio of ethylene oxide terephthalate:ethylene terephthalate, as well as a low average molecular weight of polyethylene oxide, were compared with typical prior art polymers having the opposite molar (EOT:ET) ratios, as well as high average molecular weight polyethylene oxide.

While not all possible cross-comparisons between the prior art polymers and those of the instant invention were made, the following comparisons (see Table II) are illustrative of the critical features of the compositions herein.

As can be seen from Table II, prior art polymers containing approximately equal ratios of EOT:ET (Polymers VI and XII) are not particularly useful soil release agents.

A comparison between prior art Polymer III and Polymer IV, which is prepared at the prior art-disclosed EOT:ET ratio but with a low molecular weight polyethylene oxide, illustrates the improvement (50% vs. 8%) achieved using the low molecular weight polyethylene oxide. Comparing Polymer V of this invention with its "reverse" EOT:ET ratio with Polymer IV clearly demonstrates the superiority (83% vs. 50%) of the compositions herein. Moreover, comparing Polymer V with Polymer II (83% vs. 6%) clearly demonstrates that even with identical, high, EOT:ET ratios, it is necessary to employ low molecular weight polyethylene oxide to achieve good soil release benefits.

Comparing prior art Polymer I with the instant Polymers VII – XI illustrates that the compositions herein are equivalent to the best prior art polymer even when used at one-tenth the concentration, and for one-half the rinse time.

The foregoing composition is a cloudy, easily pourable, single phase liquid. The composition is added to water at the rate of 0.35 parts of composition per 100 parts water to form a dilute solution of soil release agent having a pH of about 7. Polyester-containing fabrics rinsed in said bath for 10 minutes and dried according to the process of the present invention are provided with an excellent oily soil release finish.

Similar results are obtained with compositions consisting of from about 5% to 25% by weight of the novel polymers herein described.

TABLE II

| Polymer | Mole % Ethylene Terephthalate | Mole % Ethylene Oxide Terephthalate | Melting Point °C | Molecular Weight Polyethylene Oxide | Parts per Million Polymer in Rinse | Rinsing Time (Minutes) | % Cleaning Improvement |
|---|---|---|---|---|---|---|---|
| I |  | 15 | 198–200 | 1500 | 500 | 10 | 60 |
| II | 30 | 70 | 40–42 | 1500 | 500 | 10 | 6 |
| III | 70 | 30 | 54–56 | 3000 | 500 | 10 | 8 |
| IV | 70 | 30 | 160–165 | 600 | 500 | 10 | 50 |
| V * | 30 | 70 | semi-liquid | 600 | 500 | 10 | 83 |
| VI | 54 | 46 | 198–200 | 1540 | 50 | 5 | 18 |
| VII * | 30 | 70 | semi-solid | 600 | 50 | 5 | 44 |
| VIII * | 30 | 70 | semi-solid | 600 | 50 | 5 | 65 |
| IX * | 30 | 70 | gummy <100°C | 600 | 50 | 5 | 69 |
| X * | 30 | 70 | gummy <100°C | 600 | 50 | 5 | 59 |
| XI * | 30 | 70 | gummy <100°C | 600 | 50 | 5 | 65 |
| XII | 50 | 50 | solid | 1000 | 50 | 5 | <5 |

* Soil release polymer within the scope of the present invention.

The above data clearly show the excellent soil release properties and cleaning improvement superiority achieved by polymers falling within the scope of the present invention.

Results substantially similar to the above Examples are obtained in rinse solutions containing 50, 100 and 500 ppm of the following polymers: polyethylene terephthalate and polyethylene oxide (m.w. 600) terephthalate in a mole ratio of 7:25, total m.w. 50,000; polyethylene terephthalate and polyethylene oxide (m.w. 600) terephthalate in a mole ratio of 35:65, total m.w. 25,000; polyethylene terephthalate and polyethylene oxide (m.w. 300) terephthalate in a mole ratio of 30:70, total m.w. 30,000; polyethylene terephthalate and polyethylene oxide (m.w. 700) terephthalate in a mole ratio of 25:75, total m.w. 55,000.

EXAMPLE I

A liquid concentrate soil release composition is prepared by mixing the following ingredients

| Soil release agent* | 14.5 parts |
| Emulsifier** | 0.5 |
| Water | to 100 parts |

*A polymer comprising ethylene terephthalate to polyethylene oxide terephthalate in a molar ratio of 30:70, the polyethylene oxide linking unit having a molecular weight of 600, said polymer having a molecular weight of about 50,000.
**The condensation product of a mixture of $C_{11}$ to $C_{15}$ secondary alcohols and ethylene oxide wherein the molar ratio of ethylene oxide to alcohol is about 9:1.

What is claimed is:

1. A polymer adapted for application to polyester-containing fabrics to impart soil release properties to said fabrics, the polymer comprising repeating units of ethylene terephthalate and polyethylene oxide terephthalate at a molar ratio of ethylene terephthalate units to polyethylene oxide terephthalate units of from about 25:75 to about 35:65, said polyethylene oxide terephthalate containing polyethylene oxide having a molecular weight of from about 300 to 700, the molecular weight of said soil release polymer being in the range of from about 25,000 to about 55,000 and the melting point of said polymer being below 100°C.

2. A polymer in accordance with claim 1 having a molecular weight in the range from about 40,000 to about 55,000.

3. A polymer in accordance with claim 2 wherein the molar ratio of ethylene terephthalate to polyethylene oxide terephthalate is about 30:70.

4. A polymer in accordance with claim 2 wherein the polyethylene oxide linking unit has a molecular weight in the range from about 500 to about 650.

* * * * *